United States Patent
Wei

(10) Patent No.: US 9,193,386 B2
(45) Date of Patent: Nov. 24, 2015

(54) STEERING ANGLE DETECTING APPARATUS FOR VEHICLE AND ELECTRIC POWER STEERING APPARATUS

(71) Applicant: NSK Ltd., Shinagawa-ku, Tokyo (JP)

(72) Inventor: Yong Wei, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/386,586

(22) PCT Filed: May 13, 2013

(86) PCT No.: PCT/JP2013/003052
§ 371 (c)(1),
(2) Date: Sep. 19, 2014

(87) PCT Pub. No.: WO2013/175729
PCT Pub. Date: Nov. 28, 2013

(65) Prior Publication Data
US 2015/0051794 A1 Feb. 19, 2015

(30) Foreign Application Priority Data

May 22, 2012 (JP) ................................. 2012-116406
Jul. 10, 2012 (JP) ................................. 2012-154855

(51) Int. Cl.
B62D 15/02 (2006.01)
B62D 5/04 (2006.01)

(52) U.S. Cl.
CPC ............ B62D 15/021 (2013.01); B62D 5/0493 (2013.01)

(58) Field of Classification Search
CPC ........................... B62D 15/021; B62D 5/0493
USPC .......................................................... 701/41
See application file for complete search history.

(56) References Cited

U.S. PATENT DOCUMENTS

2002/0065593 A1* 5/2002 Ozaki ............................ 701/41
2004/0061500 A1 4/2004 Lou et al.
(Continued)

FOREIGN PATENT DOCUMENTS

JP 2-240507 A 9/1990
JP 2946964 B2 9/1999
(Continued)

OTHER PUBLICATIONS

International Search Report (PCT/ISA/210) dated Jun. 11, 2013 with English translation (three pages).
(Continued)

Primary Examiner — Fadey Jabr
Assistant Examiner — Yazan A Soofi
(74) Attorney, Agent, or Firm — Crowell & Moring LLP

(57) ABSTRACT

When an ignition is turned off, an absolute steering angle detection value immediately before the ignition is turned off is stored as an absolute steering angle stored value in a memory and a CAN relative steering angle immediately before the ignition is turned off is stored as a relative steering angle stored value in the memory. When the ignition is turned on, a value obtained by correcting the absolute steering angle stored value with an angle value and the CAN relative steering angle) by which steering is performed during a period from the time when the ignition is turned off until the time when the ignition is turned on is set as an initial value of the absolute steering angle. A provisional absolute steering angle calculated value is calculated based on the relative steering angle, using the initial value of the absolute steering angle as a reference.

11 Claims, 10 Drawing Sheets

(56) References Cited

U.S. PATENT DOCUMENTS

| | | | |
|---|---|---|---|
| 2005/0016789 A1 | 1/2005 | Asada | |
| 2007/0299583 A1* | 12/2007 | Fujita et al. | 701/41 |
| 2008/0119986 A1* | 5/2008 | Wei et al. | 701/41 |
| 2010/0010701 A1 | 1/2010 | Gaertner | |
| 2010/0286868 A1* | 11/2010 | Ehara et al. | 701/41 |
| 2013/0035831 A1* | 2/2013 | Nozu et al. | 701/69 |

FOREIGN PATENT DOCUMENTS

| | | | |
|---|---|---|---|
| JP | 2002-160656 A | 6/2002 |
| JP | 2003-307418 A | 10/2003 |
| JP | 3875202 B2 | 1/2007 |
| JP | 2009-276098 A | 11/2009 |
| JP | 2010-260465 A | 11/2010 |

OTHER PUBLICATIONS

Japanese-language Written Opinion (PCT/ISA/237) dated Jun. 11, 2013 (four pages).

International Preliminary Report on Patentability (PCT/IPEA/409 and PCT/IPEA/416) dated Jun. 11, 2013 with English translation of PCT/IPEA/409 (eight pages).

Japanese Office Action dated Jun. 2, 2015 with partial English translation (three pages).

Japanese Office Action dated Sep. 1, 2015, issued in Japanese Patent Application No. 2012-154855, with partial English translation (four pages).

Japanese Office Action dated Sep. 8, 2015, issued in Japanese Patent Application No. 2012-116406, with partial English translation (three pages).

* cited by examiner

STEERING ANGLE DETECTING APPARATUS FOR VEHICLE AND ELECTRIC POWER STEERING APPARATUS

BACKGROUND

The present invention relates to a steering angle detecting apparatus for a vehicle detecting an absolute steering angle of a steering mechanism and an electric power steering apparatus including the steering angle detecting apparatus.

In recent years, as a steering device for vehicles, such as cars and trucks, an electric power steering apparatus has been widely spread which drives an electric motor on the basis of the steering torque of a steering wheel by the driver and applies steering assist force to a steering mechanism to reduce the steering effort to be applied by the driver.

In this type of electric power steering apparatus, many control functions using the steering angle of the steering wheel have been developed in order to ensure the handling stability and comfort of the vehicle. It is necessary to detect the steering angle as soon as possible in order to rapidly fulfill the control function on the basis of the steering angle after the vehicle is started.

There is proposed an electric power steering apparatus including plural sensors so as to detect detects the steering angle rapidly (for example, see PTL 1). In order to accurately detect the absolute rotational position of a steering wheel, this technique includes a first resolver detecting a first steering angle, which is the rotation angle of a steering shaft connected to a steering wheel, a second resolver having pole pairs different in number from those of the first resolver so as to detect a second steering angle, which is the rotation angle of the steering shaft, and a third resolver detecting the rotation angle (motor electric angle) of a motor which assists steering, and calculates the absolute rotation angular position of the steering wheel from the first steering angle, the second steering angle, and the motor electric angle.

In addition, there is proposed a steering angle detecting apparatus detecting the absolute steering angle of a steering wheel on the basis of its own neutral position, storing, in a memory, the absolute steering angle at the moment when an ignition switch is turned off, and detecting the absolute steering angle on the basis of the stored value when the ignition switch is turned on (for example, see PTL 2).

CITATION LIST

Patent Literatures

PTL 1: JP 3875202 B (page 1, FIG. 2)
PTL 2: JP 2946964 B (page 1, FIG. 2)

SUMMARY

However, the related art disclosed in PTL 1 requires at least three resolvers. Therefore, the structure becomes complicated and costs increase.

In the related art disclosed in PTL 2, the absolute steering angle at the moment when the ignition switch is turned off is stored in the memory and the stored value is used as the absolute steering angle to control the electric power steering apparatus, when the ignition switch is turned on. Therefore, for example, if the steering wheel is turned while the ignition switch is in an off state, control starts on the basis of a wrong absolute steering angle, which makes it difficult to perform accurate control.

Hence, an object of the invention is to provide a steering angle detecting apparatus for a vehicle, capable of accurately detecting an absolute steering angle of a steering mechanism and an electric power steering apparatus including the steering angle detecting apparatus.

In order to achieve the object, according to a first aspect of the invention, there is provided a steering angle detecting apparatus for a vehicle including: a relative steering angle detecting unit connected to a steering angle sensor through a CAN bus, the steering angle sensor continuously detecting a relative steering angle of a steering mechanism for steering steered wheels of the vehicle during a system startup while an ignition switch is in an on state and during a system shutdown while the ignition switch is in an off state; an absolute steering angle storage unit including a non-volatile memory in which a steering angle detection value of the steering mechanism outputted immediately before the system shutdown is stored as an absolute steering angle stored value; and a provisional absolute steering angle value calculating unit configured to set, immediately after the system startup begins, a value obtained by correcting the absolute steering angle stored value stored in the non-volatile memory with a variation in the relative steering angle of the steering mechanism detected by the relative steering angle detecting unit from a last system shutdown until a present system startup, as an initial value of an absolute steering angle of the steering mechanism, and to calculate a provisional absolute steering angle value on the basis of the relative steering angle detected by the relative steering angle detecting unit, using the initial value of the absolute steering angle as a reference so as to output the provisional absolute steering angle value, during the system startup.

That is, the relative steering angle of the steering mechanism steering the steered wheels of the vehicle is continuously detected during the system startup and the system shutdown, so as to detect a variation in the relative steering angle of the steering mechanism for the period from the timing of the last system shutdown until the timing of the present system startup, and the variation in the relative steering angle is compensated to calculate the provisional absolute steering angle value.

As described above, when the system is turned off, the absolute steering angle detection value is stored. When the system is turned on at the next time, the stored absolute steering angle detection value is corrected with an angle by which steering is performed while the system is in an off state, so as to calculate the initial value of the absolute steering angle during the present system startup. Therefore, it is possible to detect the steering angle, without requiring plural sensors, unlike the apparatuses according to the related art, and to reduce costs. In addition, even when the steering wheel is steered while the system is in the off state, it is possible to detect an accurate steering angle.

According to a second aspect, preferably, the steering angle detecting apparatus further includes a relative steering angle storage unit including the non-volatile memory in which the relative steering angle detected by the relative steering angle detecting unit is stored as a relative steering angle stored value immediately before the system shutdown. Preferably, the provisional absolute steering angle value calculating unit adds a difference between the relative steering angle stored value stored in the non-volatile memory and the relative steering angle detected by the relative steering angle detecting unit to the absolute steering angle stored value stored in the non-volatile memory so as to calculate the provisional absolute steering angle value immediately after the system startup begins.

As described above, there is provided a means capable of continuously detecting the relative steering angle even when the system is turned off and the relative steering angle detected when the system is turned off is stored. Therefore, it is possible to calculate the difference between the relative steering angle detected when the system is turned off and the relative steering angle detected when the system is turned on and to accurately obtain the angle by which steering is performed while the system is in the off state by calculation.

According to a third aspect, preferably, the steering angle detecting apparatus further includes an absolute steering angle detecting unit configured to detect the absolute steering angle of the steering mechanism. Preferably, the provisional absolute steering angle value calculating unit includes a validity determining unit configured to determine validity of the calculated provisional absolute steering angle value on the basis of the absolute steering angle detected by the absolute steering angle detecting unit immediately after the system startup begins.

As described above, when the system is turned on, the validity (accuracy) of the calculated provisional absolute steering angle value is checked. Therefore, when the absolute steering angle detection value is not correctly stored at the time the system is turned off or when the provisional absolute steering angle value is not correctly calculated, it is possible to determine that the provisional absolute steering angle value is invalid. As a result, it is possible to detect a steering angle with high reliability.

According to a fourth aspect, preferably, the validity determining unit determines that the calculated provisional absolute steering angle value is valid when a difference between the calculated provisional absolute steering angle value and the absolute steering angle detected by the absolute steering angle detecting unit is equal to or less than a predetermined value and determines that the calculated provisional absolute steering angle value is invalid when the difference between the calculated provisional absolute steering angle value and the absolute steering angle detected by the absolute steering angle detecting unit is greater than the predetermined value.

As described above, by using the fact that the absolute steering angle which is detected immediately after the system is turned on is not equal to the provisional absolute steering angle value which is calculated immediately after the system is turned on and the difference therebetween becomes greater than the predetermined value when the calculated provisional absolute steering angle value is not a correct value, the validity of the provisional absolute steering angle value is determined. That is, it is possible to easily and appropriately determine the validity of the provisional absolute steering angle value, by providing with a means capable of detecting the absolute steering angle with no resetting even when the system is turned off.

According to a fifth aspect, preferably, the provisional absolute steering angle value calculating unit includes a steering angle output unit configured to output the calculated provisional absolute steering angle value without any change when the validity determining unit determines that the calculated provisional absolute steering angle value is valid.

According to this structure, it is possible to use the provisional absolute steering angle value of which validity has been checked as the steering angle detection value. Therefore, it is possible to detect a steering angle with high reliability.

According to a sixth aspect, preferably, the provisional absolute steering angle value calculating unit includes a steering angle output unit configured to output the provisional absolute steering angle value with a predetermined limitation when the validity determining unit determines that the calculated provisional absolute steering angle value is invalid.

According to this structure, it is possible to prevent the control using the steering angle detection value from reacting excessively. That is, it is possible to prevent inappropriate control due to an invalid steering angle detection value.

According to a seventh aspect, preferably, the steering angle detecting apparatus further includes: a neutral point detecting unit configured to detect a neutral point steering angle value which is a steering angle at a neutral point; an absolute steering angle calculating unit configured to calculate an absolute steering angle calculated value on the basis of the detected neutral point steering angle value and the relative steering angle of the steering mechanism when the neutral point detecting unit detects the neutral point steering angle value after the system startup begins; and a steering angle selecting unit configured to select the provisional absolute steering angle value outputted from the provisional absolute steering angle value calculating unit as the steering angle detection value until the absolute steering angle calculating unit calculates the absolute steering angle calculated value after the system startup begins, and to select, as the steering angle detection value, the absolute steering angle calculated value calculated by the absolute steering angle calculating unit, instead of the provisional absolute steering angle value, after the absolute steering angle calculating unit calculates the absolute steering angle calculated value.

According to this structure, it is possible to calculate an accurate absolute steering angle on the basis of the neutral point steering angle value and the relative steering angle of the steering mechanism. The provisional absolute steering angle value provisionally calculated is used as the steering angle detection value until the absolute steering angle calculated value having high reliability is calculated, and after the absolute steering angle calculated value having high reliability is calculated, this absolute steering angle calculated value is used as the steering angle detection value. Therefore, it is possible to appropriately detect a steering angle.

According to an eighth aspect, preferably, the steering angle selecting unit includes a gradual change unit configured to gradually change the steering angle detection value from the provisional absolute steering angle value to the absolute steering angle calculated value when the absolute steering angle calculated value is selected as the steering angle detection value, instead of the provisional absolute steering angle value.

As described above, when the steering angle detection value is changed from the provisional absolute steering angle value to the absolute steering angle calculated value, the steering angle detection value is gradually changed from the provisional absolute steering angle value to the absolute steering angle calculated value. Therefore, it is possible to prevent defects caused by a sudden change in the steering angle detection value.

According to a ninth aspect, preferably, the absolute steering angle storage unit is configured such that the provisional absolute steering angle value outputted from the provisional absolute steering angle value calculating unit immediately before the system shutdown is stored as the absolute steering angle stored value in the non-volatile memory, when the absolute steering angle calculating unit does not calculate the absolute steering angle calculated value from the system startup until the system shutdown.

According to this structure, when system is turned on later, it is possible to set the initial value of the absolute steering angle using the provisional absolute steering angle value stored in the non-volatile memory. Therefore, it is possible to maintain the reliability of the detection of the absolute steering angle.

According to a tenth aspect, preferably, when the neutral point detecting unit detects the neutral point steering angle value after the system startup begins, the absolute steering angle calculating unit calculates the absolute steering angle calculated value on the basis of the detected neutral point steering angle value and the relative steering angle detected by the relative steering angle detecting unit.

As described above, the relative steering angle detected by common relative steering angle detecting unit is used in the calculation of the provisional absolute steering angle value and the calculation of the absolute steering angle calculated value. Therefore, it is possible to prevent the occurrence of an error due to the deviation (asynchronization) between the detection timings of the relative steering angles used in the two calculations.

According to an eleventh aspect, preferably, the steering angle detecting apparatus further includes a relative steering angle calculating unit configured to calculate the relative steering angle of the steering mechanism on the basis of an angle of a motor for applying assist torque to the steering mechanism. Preferably, when the neutral point detecting unit detects a steering angle neutral point after the system startup begins, the absolute steering angle calculating unit calculates the absolute steering angle calculated value on the basis of the detected steering angle neutral point and the relative steering angle calculated by the relative steering angle calculating unit.

As described above, when the absolute steering angle calculated value is calculated, the relative steering angle calculated on the basis of a motor angle signal of an EPS is used. Therefore, it is possible to prevent the occurrence of an error corresponding to the twist of a torsion bar, as compared to a case in which a relative steering angle which is calculated on the basis of signals from, for example, a steering angle sensor installed immediately below the steering wheel (at a position closer to the steering wheel than to the torsion bar) is used. Therefore, it is possible to obtain an accurate absolute steering angle calculated value.

An aspect of an electric power steering apparatus according to the invention includes the steering angle detecting apparatus according to any one of the above-mentioned aspects and performs steering assist control on the basis of the steering angle detection value detected by the steering angle detecting apparatus for the vehicle.

According to this structure, it is possible to prevent the steering assist control from starting on the basis of a wrong absolute steering angle and to ensure handling stability.

The steering angle detecting apparatus for the vehicle according to the invention is capable of detecting an accurate absolute steering angle, without using plural sensors, when the system starts. Therefore, the electric power steering apparatus including the steering angle detecting apparatus for the vehicle is capable of improving the stability and reliability of steering assist control.

DESCRIPTION OF EMBODIMENTS

Detailed Description of the Drawings

Figure 1:
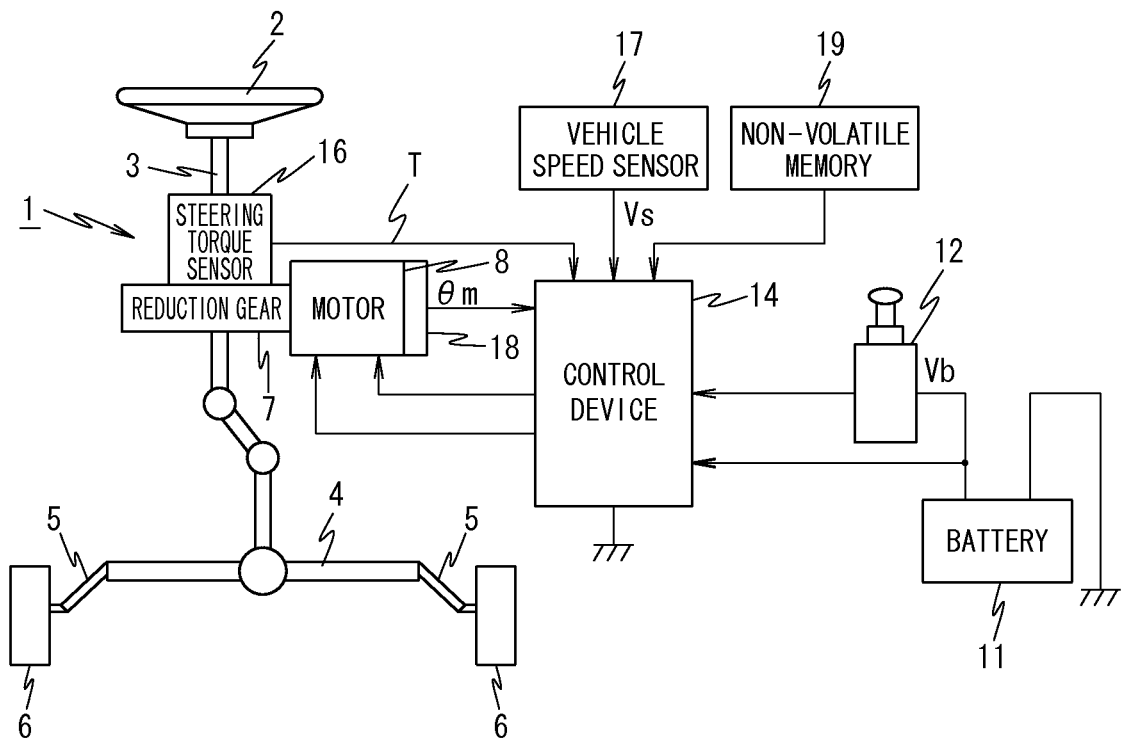
FIG. 1 is a diagram illustrating the entire structure of an electric power steering apparatus according to the invention.

FIG. 1 is a diagram illustrating the entire structure of an electric power steering apparatus according to the invention. In FIG. 1, reference numeral 1 denotes a steering device. The steering device 1 includes a steering shaft 3 to which a steering wheel 2 is attached, a rack and pinion mechanism 4 which is connected to the side of the steering shaft 3 opposite to the steering wheel 2, and left and right steered wheels 6 which are connected to the rack and pinion mechanism 4 through link mechanisms 5, such as tie rods.

An electric motor 8 is connected to the steering shaft 3 through a reduction gear 7 including, for example, a worm gear.

The electric motor 8 is a steering assist force generating motor which generates steering assist force for the electric power steering apparatus. The electric motor 8 is controlled and driven by a control device 14.

A battery voltage Vb outputted from a battery 11 provided in the vehicle is supplied to the control device 14 through an ignition switch 12 and is directly supplied to a built-in motor drive circuit.

In addition, steering torque T detected by a steering torque sensor 16, a vehicle speed Vs detected by a vehicle speed sensor 17, and a rotation angle (motor rotation angle) θm of the electric motor 8 detected by a motor rotation angle sensor 18 are received by the control device 14.

Furthermore, a non-volatile memory 19 including, for example, an EEPROM (registered trademark), is coupled to the control device 14 and the control device 14 is capable of reading data stored in the non-volatile memory 19. A relative steering angle φrc of the steering wheel 2 and an absolute steering angle detection value (steering angle detection value) φa of the steering wheel 2 calculated by the following process are stored in the non-volatile memory 19 as a relative steering angle stored value φrm and an absolute steering angle stored value φam, when shutting down the system, that is, when the ignition switch 12 is turned off.

The steering torque sensor 16 detects steering torque applied to the steering wheel 2 and then transmitted to the steering shaft 3. For example, the steering torque sensor 16 converts the steering torque into the torsional angle displacement of a torsion bar inserted between an input shaft and an output shaft (which are not illustrated), detects the torsional angle displacement as a magnetic signal, and converts the magnetic signal into an electric signal.

The control device 14 includes a vehicular steering angle detecting apparatus calculating an absolute steering angle detection value φa of the steering wheel 2 on the basis of various input signals and performs so-called steering return control for returning the steering wheel 2 to a neutral point position when steering effort applied to the steering wheel 2 is released in a steering state, on the basis of the absolute steering angle detection value φa calculated by the vehicular steering angle detecting apparatus and the vehicle speed Vs. Then, the control device 14 performs steering assist control for applying the steering assist force to a steering system on the basis of these various signals. Specifically, the control device 14 calculates a steering assist command value for generating the steering assist force by the electric motor 8 and performs feedback control for a driving current to be supplied to the electric motor 8, on the basis of the calculated steering assist command value and a detected motor current value.

Figure 2:
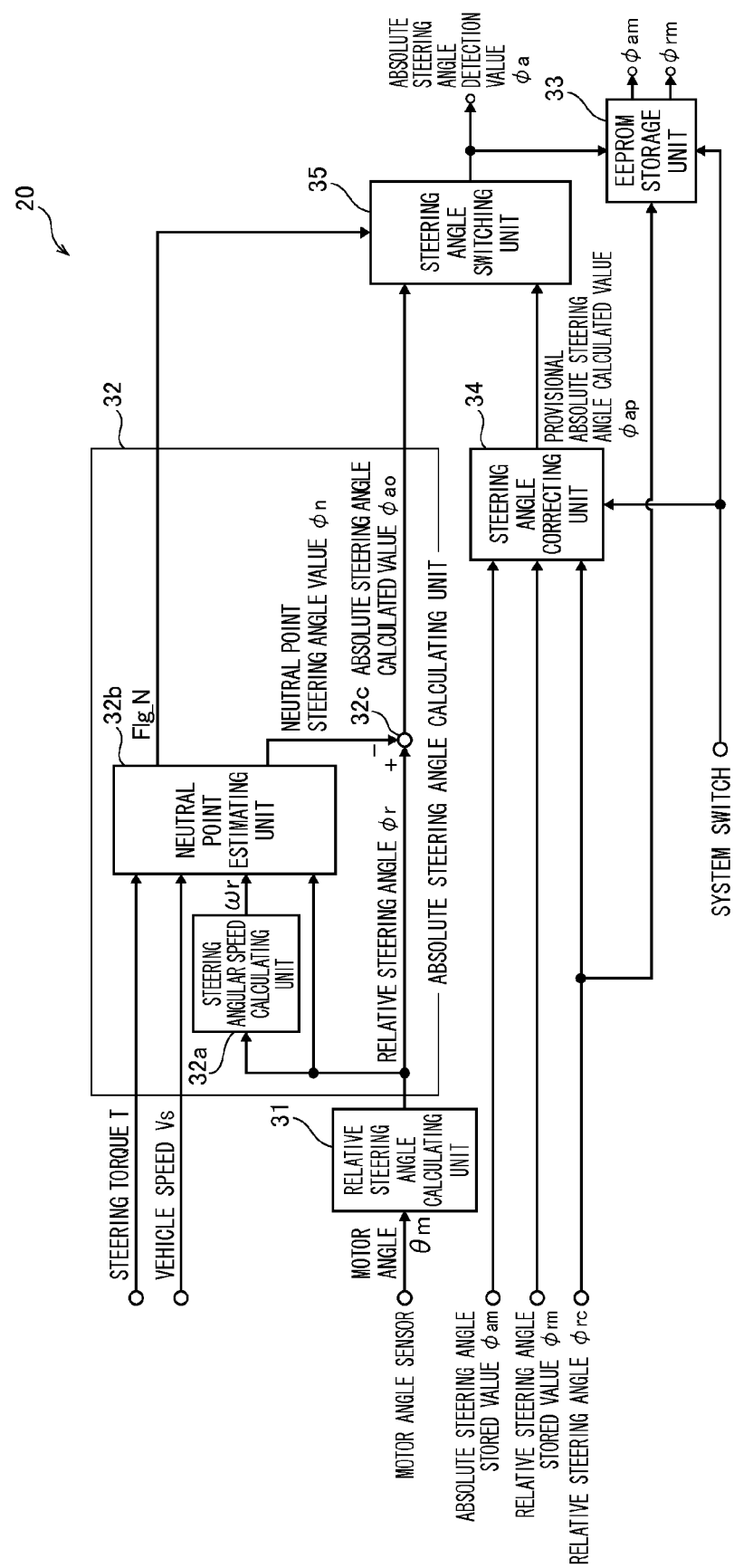
FIG. 2 is a block diagram illustrating the detailed structure of a vehicular steering angle detecting apparatus.

FIG. 2 is a block diagram illustrating the detailed structure of the vehicular steering angle detecting apparatus.

In FIG. 2, reference numeral 20 denotes the vehicular steering angle detecting apparatus. The vehicular steering angle detecting apparatus 20 includes a relative steering angle calculating unit 31 which calculates a relative steering angle φr of the steering wheel 2 and an absolute steering angle calculating unit 32 which calculates an absolute steering angle calculated value φao of the steering wheel 2. In addition, the vehicular steering angle detecting apparatus 20 includes an EEPROM storage unit 33, a steering angle correcting unit 34, and a steering angle switching unit 35.

A motor rotation angle θm detected by the motor rotation angle sensor 18 is received by the relative steering angle calculating unit 31. After the ignition switch 12 is turned on and the motor rotation angle sensor 18 starts to output the motor rotation angle θm, the relative steering angle calculating unit 31 integrates the motor rotation angle θm and calculates the relative steering angle φr considering the gear ratio. The relative steering angle φr is reset when the ignition switch 12 is turned off.

The absolute steering angle calculating unit 32 includes a steering angular speed calculating unit 32a, a neutral point estimating unit 32b, and a subtractor 32c. The steering angular speed calculating unit 32a differentiates the motor rotation angle θm and calculates a steering angular speed ωr considering the gear ratio. The steering angular speed ωr is received by the neutral point estimating unit 32b.

In addition to the steering angular speed ωr, the steering torque T, the vehicle speed Vs, and the relative steering angle φr are received by the neutral point estimating unit 32b. The neutral point estimating unit 32b determines whether or not the vehicle is traveling straight, on the basis of the steering torque T, the vehicle speed Vs, and the steering angular speed ωr. When it is determined that the vehicle is traveling straight, the neutral point estimating unit 32b calculates a neutral point steering angle value φn on the basis of the relative steering angle φr and the vehicle speed Vs.

In this embodiment, it is determined that the vehicle is traveling straight when the following state is maintained for a predetermined period of time: the steering torque T is equal to or less than a predetermined threshold value Tth at which the vehicle is likely to travel straight, the steering angular speed ωr is equal to or less than a predetermined threshold value ωth at which the vehicle is likely to travel straight, and the vehicle speed Vs is equal to or greater than a vehicle speed threshold value Vsth at which the vehicle is likely to travel straight.

The neutral point steering angle value φn is calculated according to, for example, the following Expression (1):

$$\phi n(k)=\{\phi r-\phi n(k-1)\}\times D+\phi n(k-1) \quad (1)$$

(where φr is a relative steering angle, φn(k−1) is a last neutral point steering angle, and D is a reliability coefficient determined on the basis of the vehicle speed Vs).

The reliability coefficient D is set such that it increases as the vehicle speed Vs increases.

The neutral point estimating unit 32b outputs a neutral point determination flag Flg_N=0 to the steering angle switching unit 35, which will be described below, until the vehicle enters the straight traveling state first after the system is started, that is, after power is supplied to the control device 14 through the ignition switch 12, and outputs a neutral point determination flag Flg_N=1 to the steering angle switching unit 35 after the vehicle enters the straight traveling state.

The neutral point steering angle value φn outputted from the neutral point estimating unit 32b is received by the subtractor 32c. The subtractor 32c subtracts the neutral point steering angle value φn from the relative steering angle φr calculated by the relative steering angle calculating unit 31 to calculate the absolute steering angle calculated value φao. The absolute steering angle calculated value φao is received by the steering angle switching unit 35, which will be described below.

As described above, when the relative steering angle φr or the steering angular speed ωr is calculated from the motor rotation angle θm, it is possible to estimate the neutral point (neutral position) with high accuracy, without requiring a new signal input from the outside, and also to calculate the absolute angle.

The absolute steering angle detection value φa and the relative steering angle φrc immediately before a system shutdown are stored as the absolute steering angle stored value φam and the relative steering angle stored value φrm in the non-volatile memory 19 in the EEPROM storage unit 33. That is, when a signal outputted from the ignition switch 12 (system switch) is received by the EEPROM storage unit 33, and it is detected that the ignition switch 12 is changed from an on state to an off state, the absolute steering angle detection value φa outputted from the steering angle switching unit 35 immediately before the detection is stored as the absolute steering angle stored value φam.

The relative steering angle φrc is, for example, a steering angle signal detected by a steering angle sensor (relative steering angle detecting unit) used in an antiskid brake system or the like, and is obtained through a CAN (hereinafter, φrc is also referred to as a CAN relative steering angle). The relative steering angle φrc is a value which is not reset even when the ignition switch 12 is turned off.

The steering angle correcting unit 34 calculates a provisional absolute steering angle calculated value (provisional absolute steering angle value) φap, on the basis of the CAN relative steering angle φrc, and the absolute steering angle stored value φam and the relative steering angle stored value φrm which are read from the non-volatile memory 19, when a system startup, that is, when the ignition switch 12 is turned on and power is supplied to the control device 14.

Specifically, the steering angle correcting unit 34 corrects the absolute steering angle stored value φm, which is the absolute steering angle detection value φa at the timing when the ignition switch 12 is turned off, with an angle Δφr by which steering is performed while the ignition switch 12 is in the off state (for a period from the time when the ignition switch 12 is turned off until the present time) so as to calculate the provisional absolute steering angle calculated value φap. In this embodiment, the angle Δφr is calculated as a difference between the CAN relative steering angle φrc at the present time and the relative steering angle stored value φrm, which is the CAN relative steering angle φrc at the timing when the ignition switch 12 is turned off (Δφr=φrc−φrm).

Figure 3:
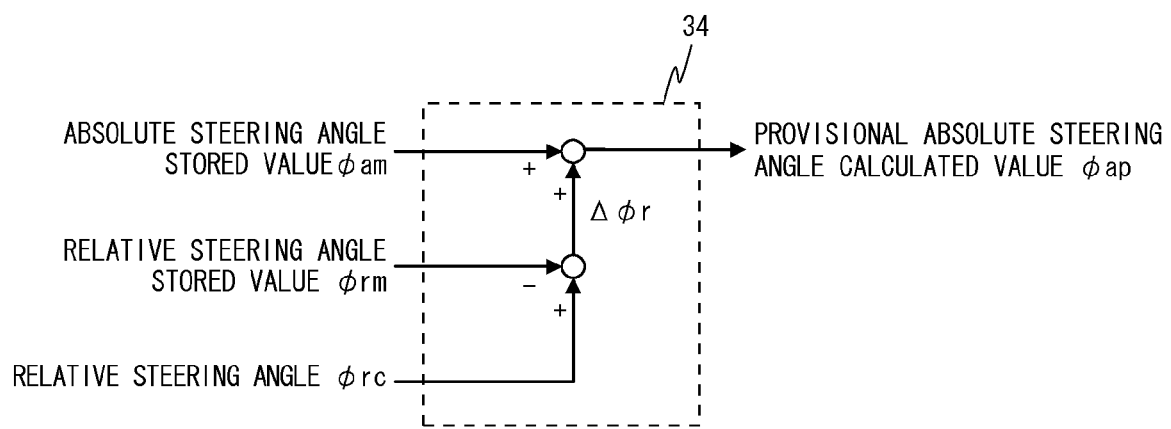
FIG. 3 is a block diagram illustrating the structure of a steering angle correcting unit.

That is, as can be seen from the structure of the steering angle correcting unit 34 illustrated in FIG. 3, the provisional absolute steering angle calculated value φap is represented by the following Expression (2):

$$\phi ap = \phi am + (\phi rc - \phi rm) \quad (2).$$

The steering angle switching unit 35 selects one of the absolute steering angle calculated value φao and the provisional absolute steering angle calculated value φap on the basis of the neutral point determination flag Flg_N set by the neutral point estimating unit 32b and outputs the selected value as the absolute steering angle detection value φa.

The steering angle switching unit 35 outputs the provisional absolute steering angle calculated value φap as the absolute steering angle detection value φa when the neutral point determination flag Flg_N is "0", that is, when it is determined that the straight traveling state of the vehicle is not detected after the ignition switch 12 is turned on and the absolute steering angle calculated value φao is not calculated. In contrast, the steering angle switching unit 35 outputs the absolute steering angle calculated value φao as the absolute steering angle detection value φa when the neutral point determination flag Flg_N is "1", that is, when the absolute steering angle calculated value φao is calculated.

When the neutral point determination flag Flg_N is inverted from "0" to "1", the absolute steering angle detection value φa is not instantly changed from the provisional absolute steering angle calculated value φap to the absolute steering angle calculated value φao, but a gradual change process (corresponding to a gradual change unit) is performed, the gradual change process gradually changing the absolute steering angle detection value φa from the provisional absolute steering angle calculated value φap to the absolute steering angle calculated value φao. As the gradual change process, for example, a process is performed which changes the provisional absolute steering angle calculated value φap by a predetermined value Δφa until the absolute steering angle detection value φa reaches the absolute steering angle calculated value φao.

In FIG. 2, the relative steering angle calculating unit 31 corresponds to a relative steering angle calculating unit, the neutral point estimating unit 32b corresponds to a neutral point detecting unit, and the subtractor 32c corresponds to an absolute steering angle calculating unit. In addition, the EEPROM storage unit 33 corresponds to an absolute steering angle storage unit and a relative steering angle storage unit, the steering angle correcting unit 34 corresponds to a provisional absolute steering angle value calculating unit, and the steering angle switching unit 35 corresponds to a steering angle selecting unit.

Next, the operation of the first embodiment will be described.

When the ignition switch 12 is turned on at a state where the vehicle is stopped, the battery voltage Vb is supplied to a microcomputer of the control device 14 and the microcomputer operates.

Then, in the vehicular steering angle detecting apparatus 20, when the ignition switch 12 is turned on, the neutral point estimating unit 32b determines whether or not the vehicle is in a straight traveling state. In this case, since the vehicle is in a stopped state (Vs<Vsth), the neutral point estimating unit 32b outputs the neutral point determination flag Flg_N=0 and does not calculate the neutral point steering angle value φn. That is, the absolute steering angle calculating unit 32 does not calculate the absolute steering angle calculated value φao.

When the ignition switch 12 is turned on, the steering angle correcting unit 34 reads the absolute steering angle stored value φam and the relative steering angle stored value φrm immediately before the last system shutdown from the non-volatile memory 19 and adds the difference between the CAN relative steering angle φrc and the relative steering angle stored value φrm to the absolute steering angle stored value φam to calculate the provisional absolute steering angle calculated value φap, as represented by the above-mentioned Expression (2).

As described above, since the neutral point determination flag Flg_N is 0 at that time, the steering angle switching unit 35 selects the provisional absolute steering angle calculated value φap as the absolute steering angle detection value φa and outputs the provisional absolute steering angle calculated value φap. Therefore, the control device 14 performs, for example, steering return control using the absolute steering angle detection value φa (=φap) outputted from the vehicular steering angle detecting apparatus 20. In this case, when the steering wheel 2 is not steered, the electric motor 8 is maintained in the stopped state.

Thereafter, when the vehicle starts to travel and the steering wheel 2 is steered to turn the vehicle, the steering torque T is greater than the threshold value Tth and the neutral point estimating unit 32b does not determine that the vehicle is in the straight traveling state and maintains the neutral point determination flag Flg_N=0. Therefore, the steering angle switching unit 35 continuously selects the provisional absolute steering angle calculated value φap calculated by the steering angle correcting unit 34 as the absolute steering angle detection value φa and outputs the provisional absolute steering angle calculated value φap.

In this way, the steering return control is performed to compensate for the lack of the steering assist torque when the steering wheel 2 returns to the neutral point, on the basis of the absolute steering angle detection value φa (=φap) and the vehicle speed Vs.

Then, when the steering wheel 2 returns to the vicinity of the neutral point and the vehicle is in the straight traveling state, the neutral point estimating unit 32b outputs the neutral point determination flag Flg_N=1. At the same time, the neutral point steering angle value φn is calculated on the basis of the vehicle speed Vs and the relative steering angle φr and is subtracted from the relative steering angle φr to calculate the absolute steering angle calculated value φao.

Since the neutral point determination flag Flg_N is 1 at that time, the steering angle switching unit 35 selects, as the absolute steering angle detection value φa, the absolute steering angle calculated value φao outputted from the absolute steering angle calculating unit 32, instead of the provisional absolute steering angle calculated value φap. At that time, the predetermined value Δφa is added to or subtracted from the provisional absolute steering angle calculated value φap to gradually change the provisional absolute steering angle calculated value φap to the absolute steering angle calculated value φao. When the provisional absolute steering angle calculated value φap reaches the absolute steering angle calculated value φao, the absolute steering angle detection value φa provisional is changed from the absolute steering angle calculated value φap to the absolute steering angle calculated value φao.

As described above, when the absolute steering angle detection value φa is changed from the provisional absolute steering angle calculated value φap to the absolute steering angle calculated value φao, the provisional absolute steering angle calculated value φap is gradually changed to be equal to the absolute steering angle calculated value φao. Therefore, it is possible to reliably prevent the influence of a sudden change in the absolute steering angle detection value $\phi a$ on the steering return control and thus prevent the driver from feeling uncomfortable.

Then, when the ignition switch 12 is turned off, the absolute steering angle detection value $\phi a$ which has been outputted from the steering angle switching unit 35 immediately before the ignition switch 12 is turned off is stored as the absolute steering angle stored value $\phi am$ in a predetermined storage area of the non-volatile memory 19 and the CAN relative steering angle $\phi rc$ detected immediately before the ignition switch 12 is turned off is stored as the relative steering angle stored value $\phi rm$ in a predetermined storage area of the non-volatile memory 19.

That is, if the absolute steering angle calculated value $\phi ao$ is calculated from the last time the system is turned on until the system is turned off, the absolute steering angle calculated value $\phi ao$ immediately before the system is turned off is stored as the absolute steering angle stored value $\phi am$ in the non-volatile memory 19. In contrast, if the absolute steering angle calculated value $\phi ao$ is not calculated from the last time the system is turned on until the system is turned off, the provisional absolute steering angle calculated value $\phi ap$ immediately before the system is turned off is stored as the absolute steering angle stored value $\phi am$ in the non-volatile memory 19.

Then, immediately after the system is turned on next time, a value obtained by correcting the absolute steering angle stored value $\phi am$ stored in the non-volatile memory 19 with the steering angle variation $\Delta\phi r$ while the system is in an off state is set as the initial value of the absolute steering angle. Then, the provisional absolute steering angle calculated value $\phi ap$ is calculated on the basis of the CAN relative steering angle $\phi rc$, using the set initial value of the absolute steering angle as a reference value.

As described above, in the above-described embodiment, when the system starts up, the absolute steering angle detection value at the timing of the last system shutdown is not used as the initial value of the absolute steering angle, but is corrected with the angle by which steering performed while the system is in the stopped state and the corrected value is set as the initial value of the absolute steering angle. Therefore, it is possible to calculate an accurate absolute steering angle, without using plural sensors, when the system starts up.

The steering angle variation occurs while the system is stopped is calculated by calculating the difference between the relative steering angle $\phi rc$ at the timing of the last system shutdown and the relative steering angle $\phi rc$ at the timing of the present system startup. That is, the relative steering angle $\phi rc$ when shutting down the system is stored as the relative steering angle stored value $\phi rm$ in the non-volatile memory 19 and is continuously detected while the system is in the stopped state. As described above, because of function which detects the relative steering angle $\phi rc$, without being reset, even when the system is stopped, it is possible to appropriately detect the steering angle variation occurs while the system is in the stopped state.

When the absolute steering angle calculated value $\phi ao$ is calculated on the basis of the neutral point steering angle value $\phi n$ and the relative steering angle $\phi r$ calculated form the motor rotation angle $\theta m$, the absolute steering angle detection value $\phi a$ is changed from the provisional absolute steering angle calculated value $\phi ap$ to the absolute steering angle calculated value $\phi ao$. Therefore, it is possible to use an absolute steering angle having a higher accuracy as the absolute steering angle detection value $\phi a$.

In this case, it is detected whether or not the vehicle is in the straight traveling state on the basis of the steering torque T, the vehicle speed Vs, and the steering angular speed $\omega r$ and the relative steering angle when the vehicle is traveling straight is used as the neutral point steering angle value $\phi n$. As described above, since signals required for general steering assist control are used, it is possible to estimate the neutral point (neutral position) with high accuracy, without requiring a new signal from the outside.

When the absolute steering angle calculated value $\phi ao$ is calculated, the relative steering angle $\phi r$ calculated on the basis of the motor rotation angle $\theta m$ of the EPS is used. Therefore, it is possible to prevent the occurrence of an error corresponding to the twist of the torsion bar, as compared to a case in which the relative steering angle calculated on the basis of signals from, for example, a steering angle sensor provided below the steering wheel 2 (at a position closer to the steering wheel 2 than to the torsion bar) is used. As a result, it is possible to obtain an accurate absolute steering angle calculated value $\phi ao$.

As described above, it is possible to reduce the ratio of error in the absolute steering angle detection value and to obtain an accurate steering assist control function.

MODIFIED EXAMPLE

Figure 4:
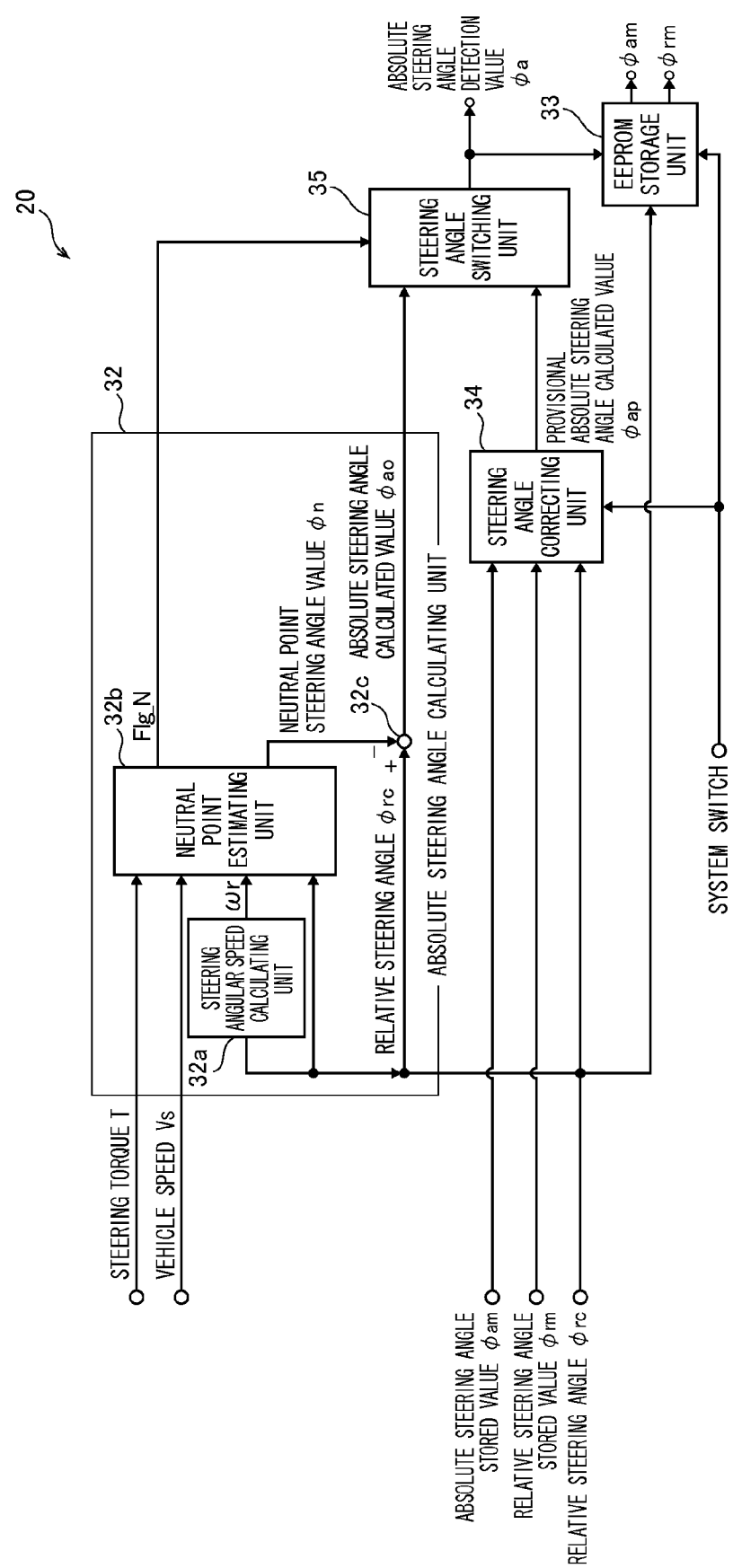
FIG. 4 is a block diagram illustrating another structure of the vehicular steering angle detecting apparatus.

In the above-described embodiment, the absolute steering angle calculating unit 32 calculates the absolute steering angle calculated value $\phi ao$ by using the motor rotation angle $\theta m$ detected by the motor rotation angle sensor 18. However, as illustrated in FIG. 4, the absolute steering angle calculated value $\phi ao$ can be calculated by using the relative steering angle $\phi rc$ from the CAN. As described above, the invention can be applied to a system without the motor angle sensor of the EPS.

In this case, the steering angle signal (CAN relative steering angle $\phi rc$) from the same system is used to calculate the absolute steering angle calculated value $\phi ao$ and the provisional absolute steering angle calculated value $\phi ap$. Therefore, it is possible to prevent the occurrence of an error due to the deviation (asynchronization) between the detection times of the relative steering angles $\phi rc$ used in the two computation operations.

APPLICATION EXAMPLE

In the above-described embodiment illustrated in FIG. 2, the following measures may be taken against the problem that, since the steering angle signals (a motor angle signal of the EPS and a CAN steering angle signal) from different systems are used, the signals are not synchronized.

For example, in order to avoid the occurrence of an error due to the detection time deviation (asynchronization), two units, that is, the EEPROM storage unit 33 and the steering angle correcting unit 34, are configured to operate only when the angle is not changed. That is, when a variation in the steering angle is equal to or less than a threshold value or when the steering angular speed is equal to or less than a threshold value, it is determined that the angle is not changed and the two units can operate. As a result, it is possible to prevent the occurrence of a steering angle error due to asynchronization during a process and to obtain a vehicular steering angle detecting apparatus capable of detecting an accurate angle.

In the above-described embodiment, the following measures may be taken against the error between the motor angle signal of the EPS and the CAN steering angle signal which is caused by the insertion of the torsion bar between the steering angle sensor which is installed immediately below the steering wheel 2 and is the source of a CAN steering angle signal and the motor angle sensor of the EPS.

For example, two units, that is, the EEPROM storage unit 33 and the steering angle correcting unit 34 are configured to operate only when the torsion bar is not twisted. That is, when the torque detected by the torque sensor is equal to or less than a threshold value, it is determined that the torsion bar is not twisted and the two units can operate. As a result, it is possible to prevent the occurrence of an error corresponding to the twist of the torsion bar during a process and to obtain a vehicular steering angle detecting apparatus capable of detecting an accurate angle.

Second Embodiment

Next, a second embodiment of the invention will be described.

The second embodiment has a function of determining the validity of the provisional absolute steering angle calculated value $\phi ap$, in addition to the functions of the first embodiment.

Figure 5:
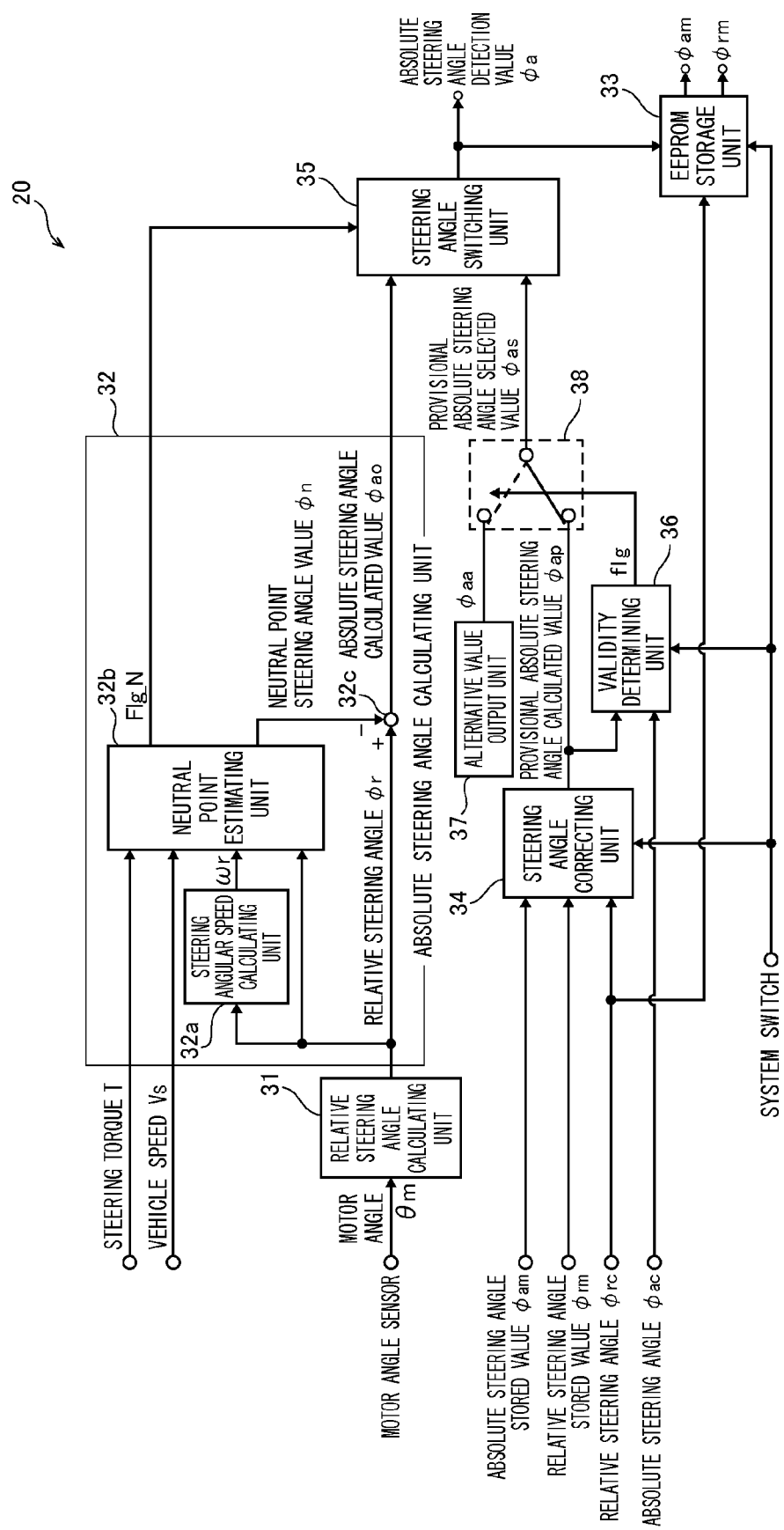
FIG. 5 is a block diagram illustrating the detailed structure of a vehicular steering angle detecting apparatus according to a second embodiment.

FIG. 5 is a block diagram illustrating the detailed structure of a vehicular steering angle detecting apparatus according to the second embodiment. A vehicular steering angle detecting apparatus 20 has the same structure as the vehicular steering angle detecting apparatus 20 illustrated in FIG. 2 except that it further includes a validity determining unit 36, an alternative value output unit 37, and a provisional absolute steering angle selecting unit 38 and the process performed by a steering angle switching unit 35 is changed. Therefore, in the second embodiment, description is focused on portions with different structures.

The validity determining unit 36 determines whether or not the provisional absolute steering angle calculated value $\phi ap$ is valid on the basis of an absolute steering angle $\phi ac$. The absolute steering angle $\phi ac$ is a steering angle signal which is detected by an absolute steering angle detecting unit, such as a sensor with low accuracy, a sensor whose accuracy is changed while the vehicle travels, or a sensor which is used in another device (for example, antiskid brake system), and is obtained through a CAN (hereinafter, $\phi ac$ is also referred to as a CAN absolute steering angle). The absolute steering angle $\phi ac$ is a value which is not reset even when an ignition switch 12 is turned off.

Figure 6:
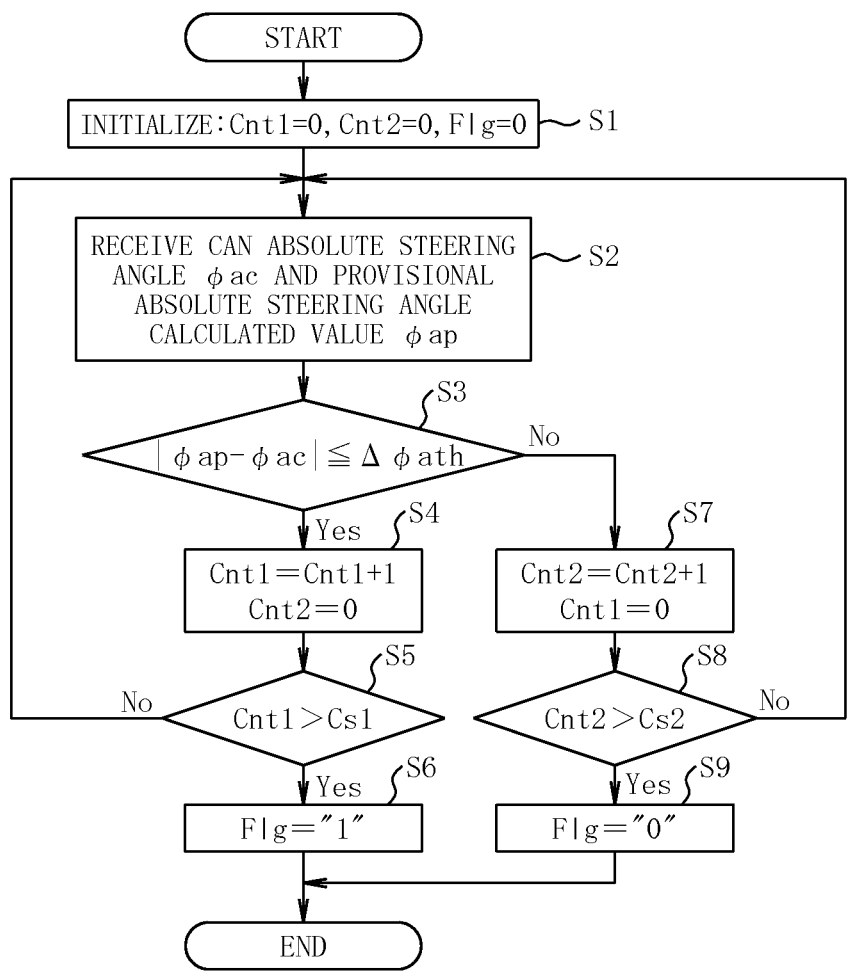
FIG. 6 is a flowchart illustrating a validity determining process performed by a validity determining unit.

FIG. 6 is a flowchart illustrating a validity determining process performed by the validity determining unit 36. The validity determining process starts when the ignition switch 12 is turned on.

First, in Step S1, the validity determining unit 36 performs initialization. Here, the validity determining unit 36 clears count values Cnt1 and Cnt2 to "0" and resets a selection flag Flg to "0".

Then, in Step S2, the validity determining unit 36 receives the CAN absolute steering angle $\phi ac$ and a provisional absolute steering angle calculated value $\phi ap$ and the process goes to Step S3.

In Step S3, the validity determining unit 36 determines whether or not the absolute value $|\phi ap-\phi ac|$ of a value obtained by subtracting the CAN absolute steering angle $\phi ac$ from the provisional absolute steering angle calculated value $\phi ap$ is equal to or less than a predetermined threshold value $\Delta\phi ath$. When $|\phi ap-\phi ac|\leq\Delta\phi ath$ is satisfied, the process goes to Step S4. When $|\phi ap-\phi ac|>\Delta\phi th$ is satisfied, the process goes to Step S7.

In Step S4, the validity determining unit 36 increases the first count value Cnt1 indicating the number of consecutive validities, clears the second count value Cnt2 indicating the number of consecutive invalidities to "0", and the process goes to Step S5.

In Step S5, the validity determining unit 36 determines whether or not the first count value Cnt1 is greater than a set value Cs1. When Cnt1≤Cs1 is satisfied, the process returns to Step S2. When Cnt1≤Cs1 is satisfied, the process goes to Step S6. Here, the set value Cs1 is provided in order to avoid a determination error and corresponds to a predetermined time.

In Step S6, the validity determining unit 36 sets the selection flag Flg to "1", outputs the selection flag Flg to the provisional absolute steering angle selecting unit 38, and the process is terminated.

In Step S7, the validity determining unit 36 increases the second count value Cnt2, clears the first count value Cnt1 to "0", and the process goes to Step S8.

In Step S8, the validity determining unit 36 determines whether or not the second count value Cnt2 is greater than a set value Cs2. When Cnt2≤Cs2 is satisfied, the process returns to Step S2. When Cnt2>Cs2 is satisfied, the process goes to Step S9. Here, the set value Cs2 is provided in order to avoid a determination error and corresponds to a predetermined time, similarly to the set value Cs1.

In Step S9, the validity determining unit 36 sets the selection flag Flg to "0", outputs the selection flag Flg to the provisional absolute steering angle selecting unit 38, and the process is terminated.

Returning to FIG. 5, the provisional absolute steering angle selecting unit 38 selects one of the provisional absolute steering angle calculated value $\phi ap$ outputted from the steering angle correcting unit 34 and an absolute steering angle alternative value $\phi aa$ outputted from the alternative value output unit 37, on the basis of the selection flag Flg received from the validity determining unit 36, and outputs the selected value as a provisional absolute steering angle selected value $\phi as$ to the steering angle switching unit 35.

When the selection flag Flg is 1, the provisional absolute steering angle selecting unit 38 selects the provisional absolute steering angle calculated value $\phi ap$ as the provisional absolute steering angle selected value $\phi as$, as FIG. 5 indicates the state of the selecting switch by a solid line. On the other hand, when the selection flag Flg is 0, the provisional absolute steering angle selecting unit 38 selects the absolute steering angle alternative value $\phi aa$ as the provisional absolute steering angle selected value $\phi as$, as FIG. 5 indicates the state of the selecting by a dashed line. In addition, for example, the CAN absolute steering angle $\phi ac$ can be used as the absolute steering angle alternative value $\phi aa$.

The steering angle switching unit 35 selects one of the absolute steering angle calculated value $\phi ao$ and the provisional absolute steering angle selected value $\phi as$, on the basis of the neutral point determination flag Flg_N set by the neutral point estimating unit 32b and outputs the selected value as an absolute steering angle detection value $\phi a$.

When the neutral point determination flag Flg_N is "0", that is, when it is not detected that the vehicle is in a straight traveling state after the ignition switch 12 is turned on and the absolute steering angle calculated value $\phi ao$ is not calculated, the steering angle switching unit 35 outputs the provisional absolute steering angle selected value $\phi as$ has as the absolute steering angle detection value $\phi a$. In contrast, when the neutral point determination flag Flg_N is "1", that is, when the absolute steering angle calculated value $\phi ao$ is calculated, the steering angle switching unit 35 outputs the absolute steering angle calculated value $\phi ao$ as the absolute steering angle detection value $\phi a$.

When the neutral point determination flag Flg_N is inverted from "0" to "1", it is determined whether or not the absolute steering angle alternative value φaa is selected as the provisional absolute steering angle selected value φas. When the absolute steering angle alternative value φaa is selected, the absolute steering angle detection value φa is immediately changed from the provisional absolute steering angle selected value φas to the absolute steering angle calculated value φao.

In contrast, when the provisional absolute steering angle calculated value φap is selected as the provisional absolute steering angle selected value φas, the absolute steering angle detection value φa is not immediately changed from the provisional absolute steering angle selected value φas to the absolute steering angle calculated value φao, but a gradual change process (corresponding to gradual change unit) is performed, the gradual change process gradually changing the absolute steering angle detection value φa from the provisional absolute steering angle selected value φas to the absolute steering angle calculated value φao. As the gradual change process, for example, a process is performed which changes the provisional absolute steering angle selected value φas by a predetermined value Δφs1 until the absolute steering angle detection value φa reaches the absolute steering angle calculated value φao.

Figure 7:
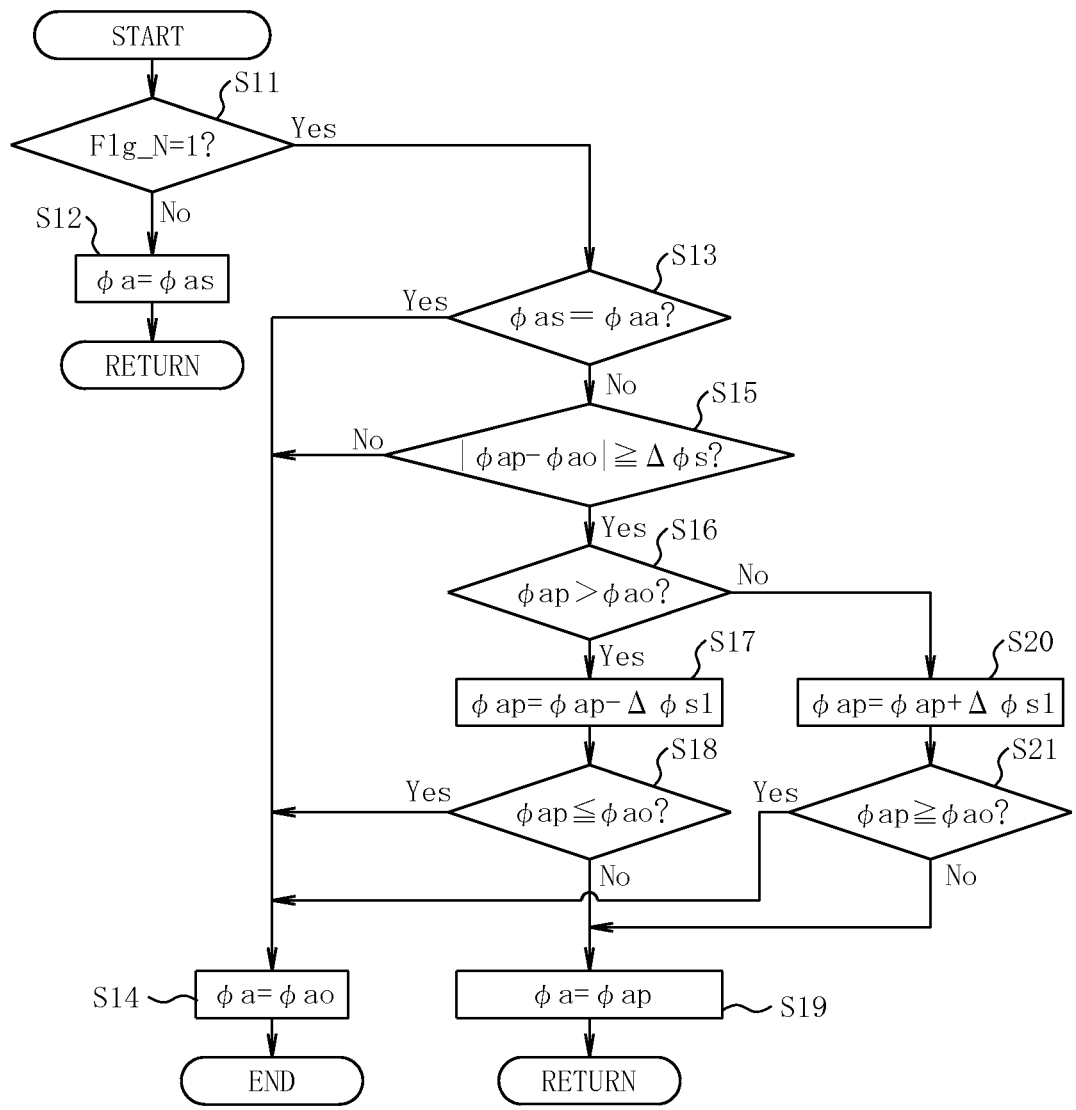
FIG. 7 is a flowchart illustrating a steering angle switching process performed by a steering angle switching unit.

FIG. 7 is a flowchart illustrating a steering angle switching process performed by the steering angle switching unit 35.

First, in Step S11, the steering angle switching unit 35 determines whether or not the neutral point determination flag Flg_N received from the neutral point estimating unit 32b is set to "1". When the neutral point determination flag Flg_N is 0, the process goes to Step S12 and the steering angle switching unit 35 outputs the provisional absolute steering angle selected value φas received from the provisional absolute steering angle selecting unit 38 as the absolute steering angle detection value φa.

When it is determined in Step S11 that the neutral point determination flag Flg_N is 1, the process goes to Step S13 and the steering angle switching unit 35 determines whether or not the last provisional absolute steering angle selected value φas is the absolute steering angle alternative value φaa (whether or not Flg is 0). When φas is equal to φaa, the process goes to Step S14, the steering angle switching unit 35 outputs the absolute steering angle calculated value φao calculated by the absolute steering angle calculating unit 32 as the absolute steering angle detection value φao, and the process is terminated.

When it is determined in Step S13 that the last provisional absolute steering angle selected value φas is the provisional absolute steering angle calculated value φap (Flg is 1), the step goes to Step S15.

In Step S15, the steering angle switching unit 35 determines whether or not a difference |φap−φao| between the present provisional absolute steering angle calculated value φap and the absolute steering angle calculated value φao is equal to or greater than a set value Δφs. When |φap−φao|<Δφs is satisfied, the process goes to Step S14. When |φap−φao|≥Δφs is satisfied, the process goes to Step S16.

In Step S16, the steering angle switching unit 35 determines whether or not the present provisional absolute steering angle calculated value φap is greater than the absolute steering angle calculated value φao. When φap>φao is satisfied, the process goes to Step S17 and the steering angle switching unit 35 calculates a value obtained by subtracting a predetermined value Δφs1 from the present provisional absolute steering angle calculated value φap as the present provisional absolute steering angle calculated value φap (φap=φap−Δφs1). Here, the predetermined value Δφs1 is set to a value at which a sudden change does not occur in the absolute steering angle detection value φa, the sudden change having an adverse effect on control using the absolute steering angle detection value φa does not occur.

Then, in Step S18, the steering angle switching unit 35 determines whether or not the provisional absolute steering angle calculated value φap calculated in Step S17 is equal to or less than the absolute steering angle calculated value φao. When φap>φao is satisfied, the process goes to Step S19, and the steering angle switching unit 35 outputs the provisional absolute steering angle calculated value φap as the absolute steering angle detection value φa, and the process returns to Step S11. In contrast, when φap≤φao is satisfied, the process goes to Step S14.

When it is determined in Step S16 that φap≤φao is satisfied, the process goes to Step S20 and the steering angle switching unit 35 calculates a value obtained by adding the predetermined value Δφs1 to the present provisional absolute steering angle calculated value φap as the present provisional absolute steering angle calculated value φap (φap=φap+Δφs1).

Then, in Step S20, the steering angle switching unit 35 determines whether or not the provisional absolute steering angle calculated value φap calculated in Step S20 is equal to or greater than the absolute steering angle calculated value φao. When φap<φao is satisfied, the process goes to Step S19, the steering angle switching unit 35 outputs the provisional absolute steering angle calculated value φap as the absolute steering angle detection value φa, and the process returns to Step S11. In contrast, when φap≥φao is satisfied, the process goes to Step S14.

In FIG. 5, the validity determining unit 36 corresponds to a validity determining unit and the provisional absolute steering angle selecting unit 38 corresponds to a steering angle output unit.

Next, the operation of the second embodiment will be described.

When the ignition switch 12 is turned on at a state where the vehicle is stopped, a battery voltage Vb is supplied to a microcomputer of the control device 14 and the microcomputer operates.

Then, in the vehicular steering angle detecting apparatus 20, when the ignition switch 12 is turned on, the neutral point estimating unit 32b determines whether or not the vehicle is in a straight traveling state. In this case, since the vehicle is in a stopped state (Vs<Vsth), the neutral point estimating unit 32b outputs the neutral point determination flag Flg_N=0 and does not calculate the neutral point steering angle value φn. That is, the absolute steering angle calculating unit 32 does not calculate the absolute steering angle calculated value φao.

When the ignition switch 12 is turned on, the validity determining unit 36 checks the validity of the provisional absolute steering angle calculated value φap calculated by the steering angle correcting unit 34.

When the steering angle correcting unit 34 correctly calculates the provisional absolute steering angle calculated value φap, the provisional absolute steering angle calculated value φap calculated by the steering angle correcting unit 34 is equal to the CAN absolute steering angle φac obtained through the CAN immediately after the present system startup begins (Yes in Step S3 of FIG. 6). Therefore, the validity determining unit 36 determines that the provisional absolute steering angle calculated value φap calculated by the steering angle correcting unit 34 is valid and sets the selection flag Flg to 1 (Step S6).

That is, when the system is turned on, the validity determining unit 36 checks the accuracy of the provisional absolute steering angle calculated value φap using the absolute steering angle (here, the CAN absolute steering angle φac) detected by another detection means.

As described above, when the validity determining unit 36 outputs Flg=1, the provisional absolute steering angle selecting unit 38 sets the selecting switch in the state represented by the solid line in FIG. 5, so as to select the provisional absolute steering angle calculated value φap as the provisional absolute steering angle selected value φas and to output the provisional absolute steering angle calculated value φap. In this case, as described above, since the neutral point determination flag Flg_N is 0 (No in Step S11 of FIG. 7), the steering angle switching unit 35 outputs the provisional absolute steering angle selected value φas (=φap) as the absolute steering angle detection value φa (Step S12).

Therefore, the control device 14 performs, for example, steering return control using the absolute steering angle detection value φa (=φas) outputted from the vehicular steering angle detecting apparatus 20. In this case, when the steering wheel 2 is not steered, the electric motor 8 is maintained in a stopped state.

Then, when the vehicle starts to travel and the steering wheel 2 is steered to turn the vehicle, the steering torque T is greater than a threshold value Tth and the neutral point estimating unit 32b does not determine that the vehicle is in the straight traveling state and maintains the neutral point determination flag Flg_N=0. Therefore, the steering angle switching unit 35 continuously selects the provisional absolute steering angle selected value φas (=φap) as the absolute steering angle detection value φa and outputs the provisional absolute steering angle selected value φas.

In this way, the steering return control is performed to compensate for the lack of the steering assist torque when the steering wheel 2 returns to the neutral point, on the basis of the absolute steering angle detection value φa (=φap) and the vehicle speed Vs.

Then, when the steering wheel 2 returns to the vicinity of the neutral point and the vehicle is in the straight traveling state, the neutral point estimating unit 32b outputs the neutral point determination flag Flg_N=1. At the same time, the neutral point steering angle value φn is calculated on the basis of the vehicle speed Vs and the relative steering angle φr and is subtracted from the relative steering angle φr to calculate the absolute steering angle calculated value φao.

Since the neutral point determination flag Flg_N is 1 at that time (Yes in Step S11 of FIG. 7), the steering angle switching unit 35 selects, as the absolute steering angle detection value φa, the absolute steering angle calculated value φao outputted from the absolute steering angle calculating unit 32, instead of the provisional absolute steering angle selected value φas. In this case, since the provisional absolute steering angle calculated value φap is selected as the provisional absolute steering angle selected value φas (No in Step S13), the predetermined value Δφs1 is added to or subtracted from the provisional absolute steering angle calculated value φap to gradually change the provisional absolute steering angle calculated value φap to the absolute steering angle calculated value φao (Step S17 or Step S20). When the provisional absolute steering angle calculated value φap reaches the absolute steering angle calculated value φao (Yes in Step S18 or Step S21), the absolute steering angle detection value φa is changed to the absolute steering angle calculated value φao (Step S14).

As described above, when the absolute steering angle calculated value φao is calculated on the basis of the neutral point steering angle value φn and the relative steering angle φr calculated from the motor rotation angle θm, the absolute steering angle detection value φa is changed from the provisional absolute steering angle selected value φas to the absolute steering angle calculated value φao. Therefore, it is possible to use an absolute steering angle having a higher accuracy as the absolute steering angle detection value φa.

When the absolute steering angle detection value φa is changed from the provisional absolute steering angle calculated value φap to the absolute steering angle calculated value φao, the provisional absolute steering angle calculated value φap is gradually changed until it is equal to the absolute steering angle calculated value φao. Therefore, it is possible to prevent the influence of a sudden change in the absolute steering angle detection value φa on steering return control and to reliably prevent the driver from feeling uncomfortable.

The relative steering angle φr which is calculated on the basis of the motor rotation angle θm of the EPS is used to calculate the absolute steering angle calculated value φao. Therefore, it is possible to prevent the occurrence of an error corresponding to the twist of the torsion bar, as compared to the absolute steering angle which is detected by, for example, the steering angle sensor installed immediately below the steering wheel 2 (at a position closer to the steering wheel 2 than to the torsion bar). As a result, it is possible to obtain an accurate absolute steering angle calculated value φao.

Then, when the ignition switch 12 is turned off, the absolute steering angle detection value φa outputted from the steering angle switching unit 35 immediately before the ignition switch 12 is turned off is stored as an absolute steering angle stored value φam in a predetermined storage area of the non-volatile memory 19 and the CAN relative steering angle φrc detected immediately before the ignition switch 12 is turned off is stored as a relative steering angle stored value φrm in a predetermined storage area of the non-volatile memory 19.

That is, if the absolute steering angle calculated value φao is calculated from the last time the system is turned on until the system is turned off, the absolute steering angle calculated value φao immediately before the system is turned off is stored as the absolute steering angle stored value φam in the non-volatile memory 19. If the absolute steering angle calculated value φao is not calculated from the last time the system is turned on until the system is turned off, the provisional absolute steering angle selected value φas immediately before the system is turned off is stored as the absolute steering angle stored value φam in the non-volatile memory 19.

Then immediately after the system is turned on next time, the validity of the provisional absolute steering angle calculated value φap which is calculated using the absolute steering angle stored value φam stored in the non-volatile memory 19, the relative steering angle stored value φrm stored in the non-volatile memory 19, and the CAN relative steering angle φrc is determined again.

In this case, when the absolute steering angle stored value φam is not correctly stored in the non-volatile memory 19, the steering angle correcting unit 34 cannot not correctly calculate the provisional absolute steering angle calculated value φap. Therefore, in this case, the provisional absolute steering angle calculated value φap calculated by the steering angle correcting unit 34 is different from the CAN absolute steering angle φac obtained through the CAN immediately after the present system startup begins (No in Step S3 of FIG. 6). Therefore, the validity determining unit 36 determines that the provisional absolute steering angle calculated value φap calculated by the steering angle correcting unit 34 is invalid and sets the selection flag Flg to 0 (Step S9).

The provisional absolute steering angle selecting unit 38 sets the selecting switch in the state represented by the dashed line in FIG. 5, so as to select the absolute steering angle alternative value φaa as the provisional absolute steering angle selected value φas and to output the absolute steering angle alternative value φaa. In this case, when the vehicle is in a stopped state and the neutral point determination flag Flg_N is 0 (Yes in Step S11 of FIG. 7), the steering angle switching unit 35 outputs the provisional absolute steering angle selected value φas (=φaa) as the absolute steering angle detection value φa.

Thereafter, when the vehicle starts to travel straight, the neutral point estimating unit 32b outputs the neutral point determination flag Flg_N=1 and calculates the absolute steering angle calculated value φao.

Then, since the neutral point determination flag Flg_N is 1, the steering angle switching unit 35 selects, as the absolute steering angle detection value φa, the absolute steering angle calculated value φao outputted from the absolute steering angle calculating unit 32, instead of the provisional absolute steering angle selected value φas. In this case, the absolute steering angle alternative value φaa with a lower accuracy than the actual absolute steering angle is selected as the provisional absolute steering angle selected value φas (Yes in Step S13), the absolute steering angle detection value φa is immediately changed to an accurate absolute steering angle calculated value φao (Step S14).

That is, when the absolute steering angle detection value φa is changed from the absolute steering angle alternative value φaa to the absolute steering angle calculated value φao, the absolute steering angle detection value φa is not gradually changed, but is immediately changed to the absolute steering angle calculated value φao. Therefore, it is possible to rapidly change the absolute steering angle detection value φa to an accurate value.

As described above, in the above-described embodiment, immediately after a system startup begins, the accuracy of the calculated provisional absolute steering angle calculated value φap is checked and the provisional absolute steering angle calculated value φap is used as the provisional absolute steering angle selected value φas. Therefore, it is possible to obtain an absolute steering angle with high reliability.

The accuracy of the provisional absolute steering angle calculated value φap is determined on the basis of whether or not the difference between the provisional absolute steering angle calculated value φap and the absolute steering angle immediately after the present system startup begins is equal to or greater than a predetermined value.

That is, the absolute steering angle detection value φa and the relative steering angle φrc immediately before a system shutdown are stored as the absolute steering angle stored value φam and the relative steering angle stored value φrm in the non-volatile memory 19 and the absolute steering angle φac is continuously detected while the system is in a stopped state. Immediately after a system startup begins, the absolute steering angle φac is compared with the provisional absolute steering angle calculated value φap calculated using the absolute steering angle stored value φam, the relative steering angle stored value φrm, and the relative steering angle φrc. When the difference between them is less than a predetermined value, it is determined that the provisional absolute steering angle calculated value φap is an accurate value (valid).

As described above, because of detecting the absolute steering angle without being reset when the system is stopped, it is possible to appropriately determines whether or not the provisional absolute steering angle calculated value φap is not invalid (that is, is correctly calculated).

When the provisional absolute steering angle calculated value φap is valid, the provisional absolute steering angle calculated value φap is used as the absolute steering angle detection value φa. When the provisional absolute steering angle calculated value φap is invalid, the absolute steering angle alternative value φaa is used as the absolute steering angle detection value φa, instead of the provisional absolute steering angle calculated value φap. Therefore, it is possible to improve the reliability of the absolute steering angle detection value φa. In this case, when the CAN absolute steering angle φac is used as the absolute steering angle alternative value φa, it is possible to output an absolute steering angle with relatively high accuracy among the invalid values as the absolute steering angle detection value φa.

As described above, it is possible to reduce the error rate of the absolute steering angle detection value and to obtain a good steering assist control function.

MODIFIED EXAMPLE

In the above-described embodiment, the vehicular steering angle detecting apparatus 20 is applied to the electric power steering apparatus without a steering lock mechanism which locks the steering wheel so as not to be turned when an ignition key is turned to a lock position and is then taken out from a keyhole. However, the vehicular steering angle detecting apparatus 20 may be applied to an electric power steering apparatus including the steering lock mechanism.

Figure 8:
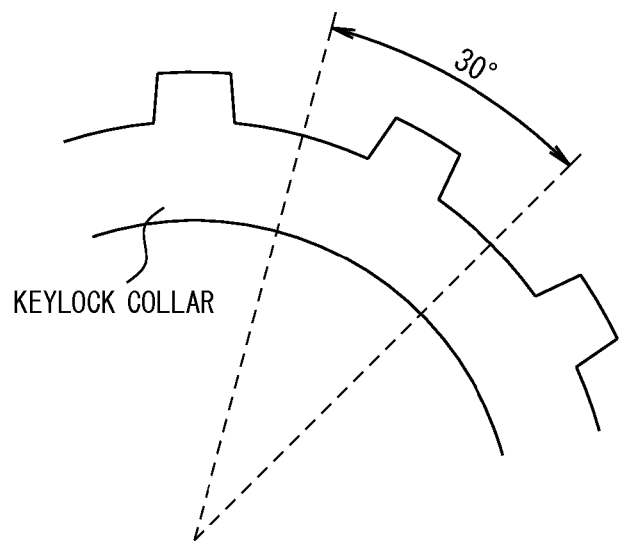
FIG. 8 is a diagram illustrating a keylock collar.

In this system, the difference between the absolute steering angle stored value φam immediately after a system startup begins and the actual steering angle when the steering wheel is turned while the system is a off state only includes a error limited by the key lock mechanism. For example, in the case of a 12-groove keylock collar, as illustrated in FIG. 8, the error is 30° (=360°/12).

Therefore, in this case, when the validity determining unit 36 determines that the provisional absolute steering angle calculated value φap is invalid, the provisional absolute steering angle calculated value φap is used, considering the error. Specifically, the output of the provisional absolute steering angle calculated value φap corresponding to one pitch of the keylock groove as the error range is prohibited or limited.

Figure 9:
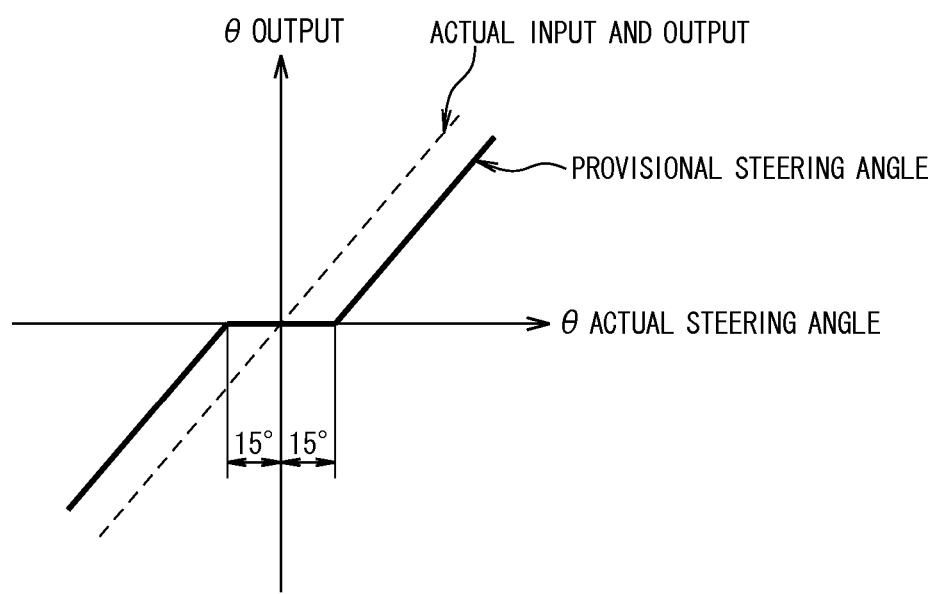
FIG. 9 is a diagram illustrating an example of a steering angle dead zone.

For example, the provisional absolute steering angle calculated value φap having a dead zone as illustrated in FIG. 9 is used as the absolute steering angle alternative value φaa outputted from the alternative value output unit 37. When the error range is 30°, the dead zone is in the range of −15° to +15°. In this case, it is possible to reduce the value which is output as the absolute steering angle detection value φa. Therefore, it is possible to prevent the control using the absolute steering angle detection value φa from reacting excessively.

Figure 10:
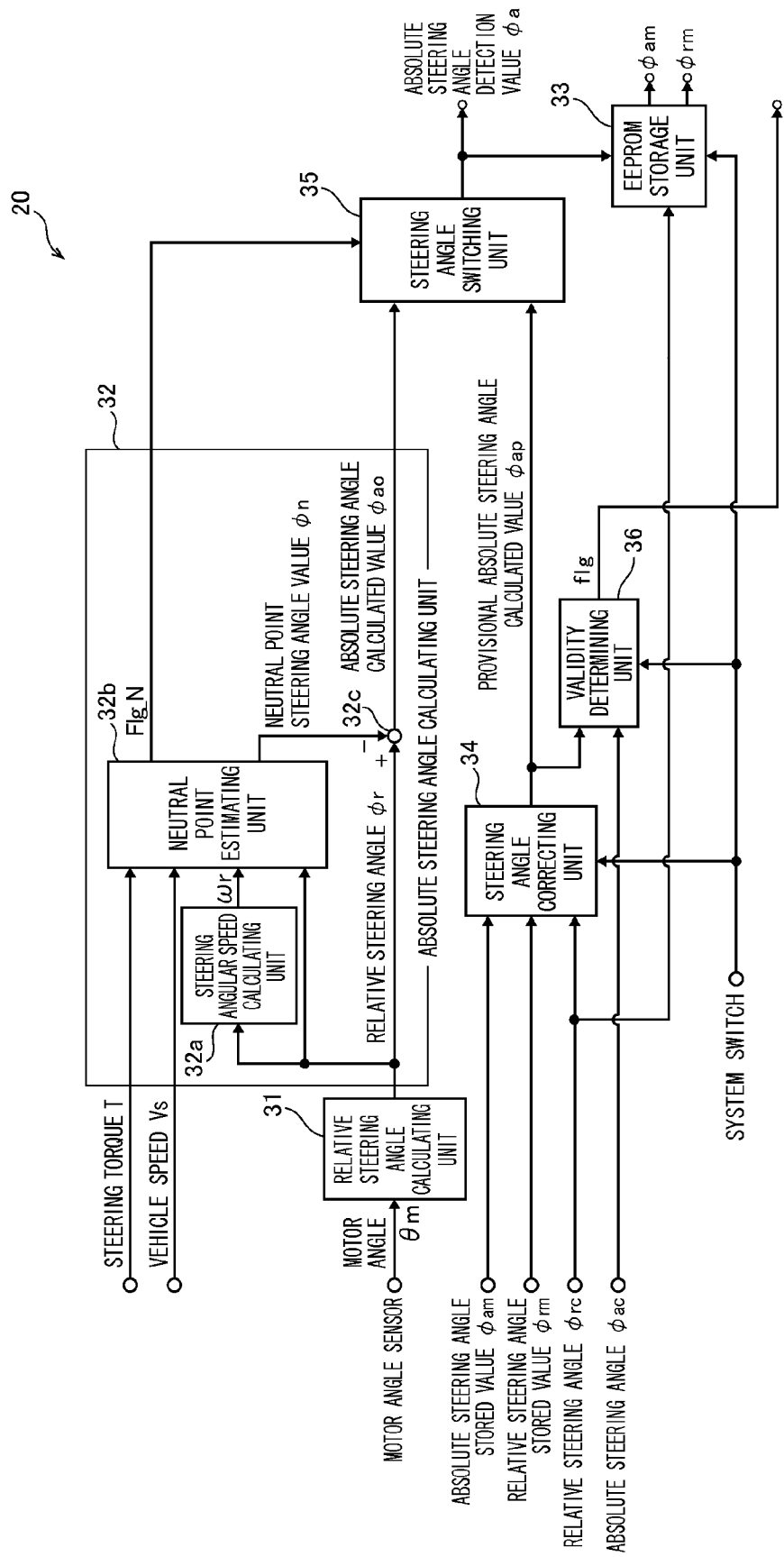
FIG. 10 is a block diagram illustrating another example of the vehicular steering angle detecting apparatus.

As illustrated in FIG. 10, even when the validity determining unit 36 determines that the provisional absolute steering angle calculated value φap is invalid, the provisional absolute steering angle calculated value φap may be outputted to the steering angle switching unit 35 and the control side may perform a process considering the error, on the basis of the selection flag Flg.

Figure 11:
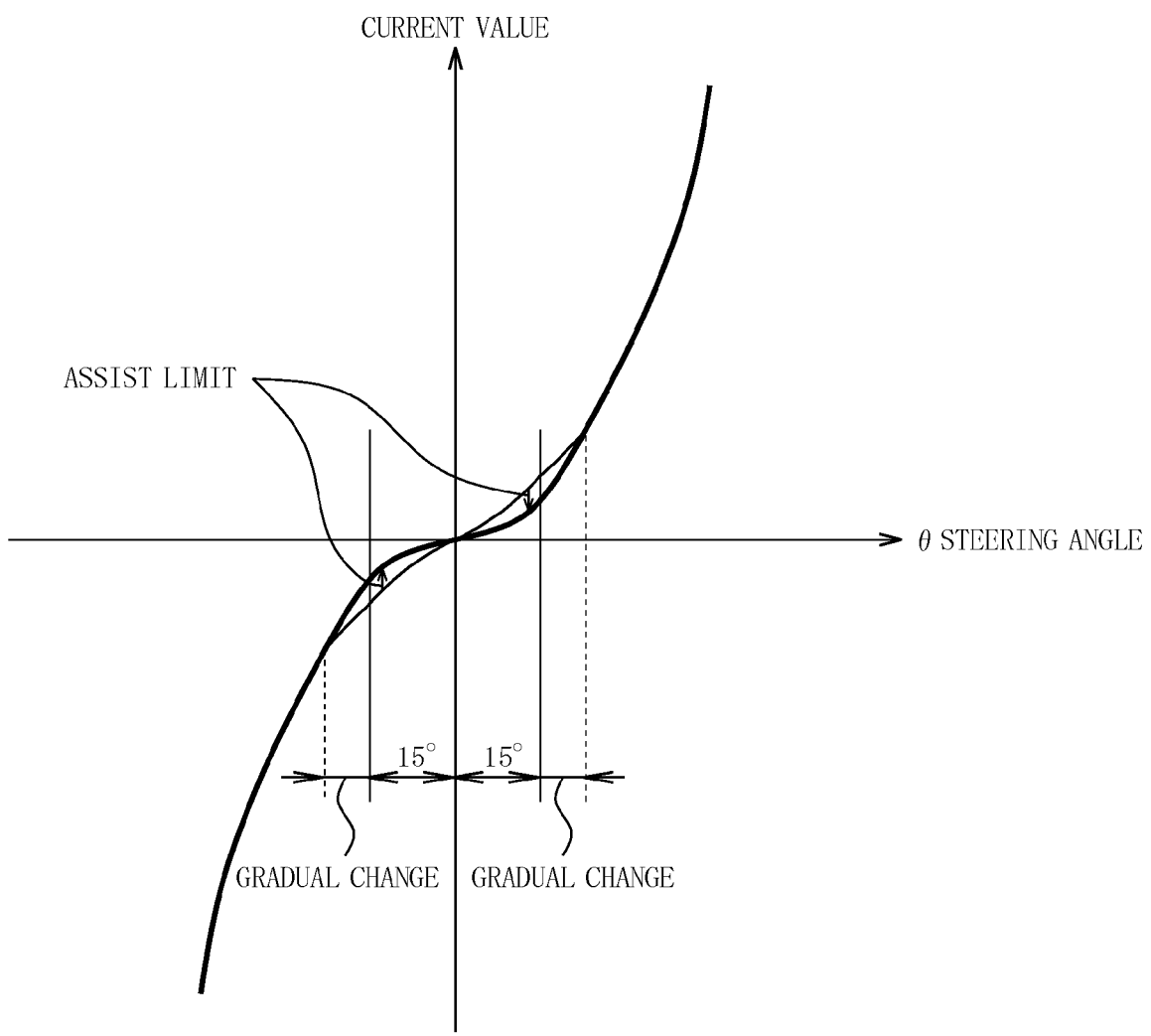
FIG. 11 is a diagram illustrating an example of output limit in EPS control.

That is, when the absolute steering angle detection value φa (provisional absolute steering angle calculated value φap) outputted from the vehicular steering angle detecting apparatus 20 is used, the steering angle dead zone illustrated in FIG. 9 may be installed on the control side. As illustrated in FIG. 11, in the range corresponding to one pitch of the keylock groove, a current value of the EPS may be limited such that an output in the expected range of the error is limited.

APPLICATION EXAMPLE

In the above-described embodiment illustrated in FIG. 5, the following measures may be taken against the problem that, since the steering angle signals (the motor angle signal of the EPS and the CAN steering angle signal) from different systems are used, the signals are not synchronized.

For example, in order to avoid the occurrence of an error due to the deviation (asynchronization) between the detection times, two units, that is, the EEPROM storage unit 33 and the validity determining unit 36, are configured to operate only when the angle is not changed. That is, when a variation in the steering angle is equal to or less than a threshold value or when the steering angular speed is equal to or less than a threshold value, it is determined that the angle is not changed and the two unit can operate. As a result, it is possible to prevent the occurrence of a steering angle error due to asynchronization during a process and to obtain a vehicular steering angle detecting apparatus capable of detecting an accurate angle.

In the above-described embodiment, the following measures may be taken against the error between the motor angle signal of the EPS and the CAN steering angle signal which is caused by the insertion of the torsion bar between the steering angle sensor which is installed immediately below the steering wheel 2 and is the source of a CAN steering angle signal and the motor angle sensor of the EPS.

For example, two units, that is, the EEPROM storage unit 33 and the validity determining unit 36, are configured to operate only when the torsion bar is not twisted. That is, when the torque detected by the torque sensor is equal to or less than a threshold value, it is determined that the torsion bar is not twisted and the two units can operate. As a result, it is possible to prevent the occurrence of an error corresponding to the twist of the torsion bar during a process and to obtain a vehicular steering angle detecting apparatus capable of detecting an accurate angle.

INDUSTRIAL APPLICABILITY

According to the vehicular steering angle detecting apparatus of the invention, it is possible to detect an accurate absolute steering angle when the system starts up, without using plural sensors.

Therefore, in the electric power steering apparatus including the vehicular steering angle detecting apparatus, it is possible to improve the stability and reliability of steering assist control.

REFERENCE SIGNS LIST

1: steering device
2: steering wheel
3: steering shaft
7: reduction gear
8: electric motor
14: control device
16: steering torque sensor
17: vehicle speed sensor
18: motor rotation angle sensor
19: non-volatile memory
20: vehicular steering angle detecting apparatus
31: relative steering angle calculating unit
32: absolute steering angle calculating unit
32a: steering angular speed calculating unit
32b: neutral point estimating unit
32c: subtractor
33: EEPROM storage unit
34: steering angle correcting unit
35: steering angle switching unit
36: validity determining unit
37: alternative value output unit
38: provisional absolute steering angle selecting unit

The invention claimed is:

1. A steering angle detecting apparatus for a vehicle comprising:
a relative steering angle sensor connected to a CAN bus, the relative steering angle sensor continuously detecting a relative steering angle of a steering mechanism for steering steered wheels of the vehicle during a system startup while an ignition switch is in an ON state and during a system shutdown while the ignition switch is in an OFF state;
an absolute steering angle storage unit including a non-volatile memory in which a steering angle detection value of the steering mechanism outputted immediately before the system shutdown is stored as an absolute steering angle stored value;
a provisional absolute steering angle value calculating device that is a hardware component of a computer and that is configured to set, immediately after the system startup begins, a value obtained by correcting the absolute steering angle stored value stored in the non-volatile memory with a variation in the relative steering angle of the steering mechanism detected by the relative steering angle sensor from a last system shutdown until a present system startup, as an initial value of an absolute steering angle of the steering mechanism, and to calculate a provisional absolute steering angle value on the basis of the relative steering angle detected by the relative steering angle sensor, using the initial value of the absolute steering angle as a reference so as to output the provisional absolute steering angle value, during the system startup; and
a relative steering angle storage including the non-volatile memory in which the relative steering angle detected by the relative steering angle sensor, but not the absolute steering angle, is stored as a relative steering angle stored value immediately before the system shutdown, wherein
the provisional absolute steering angle value calculating device adds a difference between the relative steering angle stored value stored in the non-volatile memory and the relative steering angle detected by the relative steering angle sensor to the absolute steering angle stored value stored in the non-volatile memory so as to calculate the provisional absolute steering angle value immediately after the system startup begins, and
steering assist control is performed on the basis of the steering angle detection value detected by the steering angle detecting apparatus.

2. The steering angle detecting apparatus according to claim 1, further comprising:
an absolute steering angle sensor configured to detect the absolute steering angle of the steering mechanism,
wherein the provisional absolute steering angle value calculating device includes a validity determining device that is a hardware component of the computer and that is configured to determine validity of the calculated provisional absolute steering angle value on the basis of the absolute steering angle detected by the absolute steering angle sensor immediately after the system startup begins.

3. The steering angle detecting apparatus according to claim 2,
wherein the validity determining device determines that the calculated provisional absolute steering angle value is valid when a difference between the calculated provisional absolute steering angle value and the absolute steering angle detected by the absolute steering angle sensor is equal to or less than a predetermined value, and the validity determining device determines that the calculated provisional absolute steering angle value is invalid when the difference between the calculated provisional absolute steering angle value and the absolute steering angle detected by the absolute steering angle sensor is greater than the predetermined value.

4. The steering angle detecting apparatus according to claim 2, wherein the provisional absolute steering angle value calculating device includes a steering angle output device that is a hardware component of the computer and that is configured to output the calculated provisional absolute steering angle value without any change when the validity determining device determines that the calculated provisional absolute steering angle value is valid.

5. The steering angle detecting apparatus according to claim 2, wherein the provisional absolute steering angle value calculating device includes a steering angle output device that is a hardware component of the computer and that is configured to output the provisional absolute steering angle value with a predetermined limitation when the validity determining device determines that the calculated provisional absolute steering angle value is invalid.

6. The steering angle detecting apparatus according to claim 1, further comprising:

a neutral point sensor configured to detect a neutral point steering angle value which is a steering angle at a neutral point;

an absolute steering angle calculating device that is a hardware component of the computer and that is configured to calculate an absolute steering angle calculated value on the basis of the detected neutral point steering angle value and the relative steering angle of the steering mechanism when the neutral point sensor detects the neutral point steering angle value after the system startup begins; and a steering angle selecting device that is a hardware component of the computer and that is configured to select the provisional absolute steering angle value outputted from the provisional absolute steering angle value calculating device as the steering angle detection value until the absolute steering angle calculating device calculates the absolute steering angle calculated value after the system startup begins, and to select, as the steering angle detection value, the absolute steering angle calculated value calculated by the absolute steering angle calculating device, instead of the provisional absolute steering angle value, after the absolute steering angle calculating device calculates the absolute steering angle calculated value.

7. The steering angle detecting apparatus according to claim 6, wherein the steering angle selecting device includes a gradual change device that is a hardware component of the computer and that is configured to gradually change the steering angle detection value from the provisional absolute steering angle value to the absolute steering angle calculated value when the absolute steering angle calculated value is selected as the steering angle detection value, instead of the provisional absolute steering angle value.

8. The steering angle detecting apparatus according to claim 6, wherein the absolute steering angle storage is configured such that the provisional absolute steering angle value outputted from the provisional absolute steering angle value calculating device immediately before the system shutdown is stored as the absolute steering angle stored value in the non-volatile memory, when the absolute steering angle calculating device does not calculate the absolute steering angle calculated value from the system startup until the system shutdown.

9. The steering angle detecting apparatus according to claim 6, wherein, when the neutral point sensor detects the neutral point steering angle value after the system startup begins, the absolute steering angle calculating device calculates the absolute steering angle calculated value on the basis of the detected neutral point steering angle value and the relative steering angle detected by the relative steering angle sensor.

10. The steering angle detecting apparatus according to claim 6, further comprising:

a relative steering angle calculating device that is a hardware component of the computer and that is configured to calculate the relative steering angle of the steering mechanism on the basis of an angle of a motor for applying assist torque to the steering mechanism, wherein, when the neutral point sensor detects a neutral point steering angle value after the system startup begins, the absolute steering angle calculating device calculates the absolute steering angle calculated value on the basis of the detected neutral point steering angle value and the relative steering angle calculated by the relative steering angle calculating device.

11. An electric power steering apparatus comprising:
a steering angle detecting apparatus including:

a relative steering angle sensor connected to a CAN bus, the relative steering angle sensor continuously detecting a relative steering angle of a steering mechanism for steering steered wheels of the vehicle during a system startup while an ignition switch is in an ON state and during a system shutdown while the ignition switch is in an OFF state;

an absolute steering angle storage including a non-volatile memory in which a steering angle detection value of the steering mechanism outputted immediately before the system shutdown is stored as an absolute steering angle stored value;

a provisional absolute steering angle value calculating device that is a hardware component of a computer and that is configured to set, immediately after the system startup begins, a value obtained by correcting the absolute steering angle stored value stored in the non-volatile memory with a variation in the relative steering angle of the steering mechanism detected by the relative steering angle sensor from a last system shutdown until a present system startup, as an initial value of an absolute steering angle of the steering mechanism, and to calculate a provisional absolute steering angle value on the basis of the relative steering angle detected by the relative steering angle sensor, using the initial value of the absolute steering angle as a reference so as to output the provisional absolute steering angle value, during the system startup; and a relative steering angle storage including the non-volatile memory in which the relative steering angle detected by the relative steering angle sensor, but not the absolute steering angle, is stored as a relative steering angle stored value immediately before the system shutdown, wherein the provisional absolute steering angle value calculating device adds a difference between the relative steering angle stored value stored in the non-volatile memory and the relative steering angle detected by the relative steering angle sensor to the absolute steering angle stored value stored in the non-volatile memory so as to calculate the provisional absolute steering angle value immediately after the system startup begins, and steering assist control is performed on the basis of the steering angle detection value detected by the steering angle detecting apparatus.

* * * * *